(12) United States Patent
Bai

(10) Patent No.: US 10,493,415 B2
(45) Date of Patent: Dec. 3, 2019

(54) METHOD OF MANUFACTURING A COMPOSITE GRANULAR GROUTING MATERIAL

(71) Applicant: BIC INC., Daejeon (KR)

(72) Inventor: Sun Bai, Seoul (KR)

(73) Assignee: BIC INC., Daejeon (KR)

( * ) Notice: Subject to any disclaimer, the term of this patent is extended or adjusted under 35 U.S.C. 154(b) by 151 days.

(21) Appl. No.: 15/859,019

(22) Filed: Dec. 29, 2017

(65) Prior Publication Data

US 2018/0193811 A1    Jul. 12, 2018

(30) Foreign Application Priority Data

Jan. 6, 2017 (KR) .................. 10-2017-0002150
Oct. 27, 2017 (KR) .................. 10-2017-0140982

(51) Int. Cl.
| | |
|---|---|
| *B01J 2/14* | (2006.01) |
| *B01J 2/00* | (2006.01) |
| *C04B 14/06* | (2006.01) |
| *C04B 20/10* | (2006.01) |
| *C04B 18/02* | (2006.01) |

(Continued)

(52) U.S. Cl.
CPC .................. *B01J 2/14* (2013.01); *B01J 2/003* (2013.01); *C04B 14/06* (2013.01); *C04B 18/02* (2013.01); *C04B 18/021* (2013.01); *C04B 20/1055* (2013.01); *C04B 28/001* (2013.01); *C04B 40/0042* (2013.01); *C04B 2111/27* (2013.01);

(Continued)

(58) Field of Classification Search
None
See application file for complete search history.

(56) References Cited

U.S. PATENT DOCUMENTS 4,973,237 A  *  11/1990  Hajou ................. B01J 2/14
                                                       366/93
5,476,543 A  *  12/1995  Ryan .................. C09K 8/516
                                                       106/218

(Continued)

FOREIGN PATENT DOCUMENTS

| JP | 2004-197425 | 7/2004 |
|---|---|---|
| JP | 5999718 | 9/2016 |

(Continued)

OTHER PUBLICATIONS

European Search Report, dated May 17, 2018, received in EP Application No. 18150226.

(Continued)

*Primary Examiner* — Mary Lynn F Theisen
(74) *Attorney, Agent, or Firm* — Davis Wright Tremaine LLP; Heather M. Colburn

(57) ABSTRACT

A method of manufacturing a composite granular grouting material according to the present invention comprises: mixing bentonite and auxiliary component; forming spherical composite granules by agglomerating the mixture of bentonite and auxiliary component; drying the formed composite granules; and forming bentonite layer having lower density for forming slurry outside the composite granules by mixing bentonite with the spherical composite granules and agglomerating the same. The grouting material according to the present invention has excellent thermal conductivity and water blocking capability.

10 Claims, 7 Drawing Sheets

(51) Int. Cl.
*C04B 28/00* (2006.01)
*C04B 40/00* (2006.01)
*C09K 8/50* (2006.01)
*C04B 111/70* (2006.01)
*C04B 111/27* (2006.01)

(52) U.S. Cl.
CPC ....... *C04B 2111/70* (2013.01); *C04B 2201/32* (2013.01); *C09K 8/50* (2013.01)

(56) References Cited

U.S. PATENT DOCUMENTS

| | | | | |
|---|---|---|---|---|
| 5,526,879 | A * | 6/1996 | Champ | E21B 33/068 137/268 |
| 2002/0096330 | A1 * | 7/2002 | James | C04B 14/104 166/292 |
| 2003/0188666 | A1 * | 10/2003 | Johnson, Jr. | F24T 10/10 106/638 |
| 2015/0291477 | A1 | 10/2015 | Bai et al. | |
| 2017/0058181 | A1 * | 3/2017 | Frantz | C09K 8/467 |

FOREIGN PATENT DOCUMENTS

| | | |
|---|---|---|
| KR | 10-2011-0107131 | 9/2011 |
| KR | 10-1471003 | 1/2014 |
| KR | 10-2014-0042155 | 4/2014 |
| KR | 10-1348134 | 12/2014 |
| KR | 10-2016-0014483 | 2/2016 |

OTHER PUBLICATIONS

Radhakrishna, L. et al., "Impact of Bentonite Coating over Silica Sand during addition of water," International Journal for Research & Development in Technology, 2016, 6(5):132-135.

English Translation of KR Patent No. 10-2014-0042155, Published Apr. 7, 2014.

* cited by examiner

METHOD OF MANUFACTURING A COMPOSITE GRANULAR GROUTING MATERIAL

FIELD OF THE INVENTION

The present invention relates to a method of manufacturing a composite grouting granule in geothermal application. More particularly, the present invention relates to a method of manufacturing a composite granular grouting material, which does not need both bentonite powder and water for preparing bentonite slurry at the time of construction, but needs water only, whereby the construction operation is convenient, and which has high thermal conductivity as well as improved water blocking capability.

BACKGROUND OF THE INVENTION

Bentonite, having the property of absorbing water and swelling, is being widely used as a grouting material for constructing a water-blocking wall for protecting a heat transfer layer of a underground heat exchanger in GSHP (Ground Source Heat Pump) systems. However, since pure bentonite has low thermal conductivity, it should be mixed with auxiliary component such as sand, alumina or graphite when using it in the GSHP systems where high heat transfer rate is required.

In case that bentonite is to be used as a grouting material, usually bentonite powder is mixed with water first, then said auxiliary component such as sand etc. is added, and resulting mixture in slurry form is used. However, when bentonite powder, water and the auxiliary component are mixed, since the materials have different specific gravities, separation of materials occurs over time, and it is hard to use the mixture.

In order to solve such a problem, Korean Patent No. 1,471,003 teaches a method for producing granulated bentonite-based grouting material, in which bentonite is mixed any of sand, alumina, or graphite, and the mixture is granulated. According to this method, at least one of sand, alumina and graphite is added to bentonite raw material as an auxiliary component, and the resulting mixture is heated, then the molded body of bentonite is pulverized by grinding to produce granules of uniform sizes.

However, in the course of using this patented method, sintering the materials at high temperature (700 to 1,200° C.) decreases the water-blocking capability due to the thermal deformation of bentonite, and producing costs are increased because of energy cost for heating and complicated processes such as cooling step and pulverizing step. In addition, when the ratio of auxiliary components such as sand increases in order to raise the thermal conductivity, excessive bentonite powder which has not been reacted with sand is dissolved in water as time goes on, or separation of bentonite and sand could happen.

The other problem is that, since preparing only the slurry, which is formed by mixing the granulated bentonite with water, is not sufficient to block water at the time of construction, slurry should be prepared by mixing bentonite powder and water first, then the granulated bentonite is to be added thereto, thereby, the construction procedure becomes inconvenient.

BRIEF SUMMARY OF THE INVENTION

An object of the present invention is to provide a method of manufacturing a composite granular grouting material that has sufficiently high thermal conductivity and shows no separation of bentonite and auxiliary component.

Another object of the present invention is to provide a method of manufacturing a composite granular grouting material that has high water blocking capability.

Still, another object of the present invention is to provide a method of manufacturing a composite granular grouting material which is able to decrease the producing cost of composite granules and are easy to use in construction.

In order to achieve the above objects, the present invention provides a method of manufacturing a composite granular grouting material which comprises the steps of: mixing bentonite and auxiliary component; forming spherical composite granules by agglomerating the mixture of bentonite and auxiliary component; drying the formed composite granules; and forming bentonite layer having lower density for forming slurry outside the composite granules by mixing bentonite with the spherical composite granules and agglomerating the same.

Preferably, water is sprayed during agglomerating.

Preferably, said auxiliary component is one of sand, alumina, and graphite.

Preferably, the mixture ratio of the bentonite to sand of the composite granules may range from 1:1 to 1:8.

Preferably, a binder may be added to improve mechanical strength further.

The bentonite layer for forming slurry may further include viscosity-reducing agent or dispersant.

Preferably, the average diameter of the composite granular grouting material may range from 1 to 10 mm.

According to the present invention, thermal conductivity of the composite granular grouting material can be increased by making the composite granule to comprise bentonite and auxiliary component to prevent the separation between them, and the composite granule grouting material is easy to use in construction and have superior water blocking capability by forming bentonite layer having lower density for slurry outside the composite granules.

BRIEF DESCRIPTION OF THE DRAWINGS

The above and other objects, features and advantages of the present invention will be more clearly understood from the following detailed description taken in conjunction with the accompanying drawings, in which:

FIGS. 7A and 7B are photos showing the effectiveness of the present invention, wherein FIG. 7A shows micro-structure of the composite granules without bentonite layer for slurry forming to which water is added, and FIG. 7B shows micro-structure of composite granules having bentonite layer for forming slurry to which water is added.

DETAILED DESCRIPTION OF THE INVENTION

Preferred embodiments of the present invention will be described in detail below with reference to the accompanying drawings. Prior to the following description of the present invention, it should be noted that the following structural and functional descriptions are intended merely to illustrate embodiments based on the spirit of the present invention, embodiments based on the spirit of the present invention may be practiced in various forms, and the present invention should not be construed as being limited to embodiments described herein.

Figure 1:
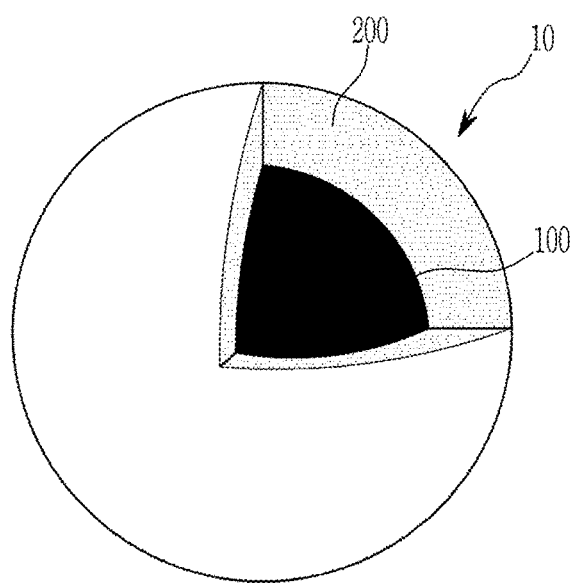
FIG. 1 is a partial sectional view of a composite granular grouting material according to an embodiment of the present invention.
Figure 2:
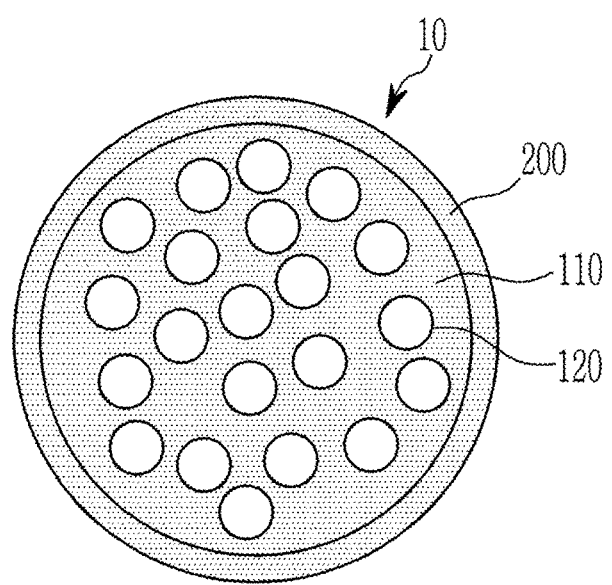
FIG. 2 is a sectional view of the composite granular grouting material shown in FIG. 1.

FIG. 1 is a partial sectional view of a composite granular grouting material 10 according to an embodiment of the present invention, and FIG. 2 is a sectional view of the composite granular grouting material 10 shown in FIG. 1.

As shown in these drawings, the composite granular grouting material 10 according to the present embodiment includes composite granule 100, and bentonite layer 200 for forming slurry.

After a grouting material has been injected into a drilled bore hole of which function is heat transfer layer, the grouting material must maintain low fluid loss sufficient to prevent underground water or surface water from infiltrating thereinto, and must have high viscosity sufficient to stop itself from convectional flowing. At the same time, the grouting material must have high thermal conductivity, and desirable adhesive strength; thereby outer surface of a pipe of a underground heat exchanger and the wall surface of a drilled bore hole are be in tight contact without any bubbles between them.

Furthermore, the grouting material should be chemically stable, thus, must maintain chemical inertness for not being reacted with other materials, and must be easily mixed and injected. Moreover, the grouting material must be cheap, and should be safe when a worker handles it.

To attain that end, the composite granular grouting material 10 according to the present embodiment comprises composite granules 100 having improved thermal conductivity inside the composite granular grouting material 10, and bentonite layers 200 for forming slurry, that can be easily solved in water, outside the composite granular grouting material 10.

The composite granules 100 may include bentonite 110 and sand 120 as an auxiliary component. Sand 120 may be mixed in an amount of 100 wt % to 800 wt % with respect to the weight of the bentonite raw material. If the content of auxiliary component exceeds 800 wt %, the composite granules 100 are not formed well in the form of granules. And, if the content of auxiliary component is less than 100 wt %, thermal conductivity may not be sufficient.

The bentonite layer 200 for forming slurry is composed of bentonite and formed outside the composite granule 100, and density of the layer 200 is lower than the density of the bentonite which is included in the composite granule 100, i.e., the bentonite layer 200 is formed by loose bentonite.

The bentonite layers 200 for forming slurry may further include a viscosity-reducing agent or a dispersant. When the bentonite layers 200 for forming slurry are dissolved in water, the loose bentonite fills up the boundary between the composite granules 100, hence fluid loss is decreased. Therefore, if the viscosity-reducing agent or the dispersant is included in the bentonite layers 200 for forming slurry, then the action is further activated.

The bentonite 110 contained in the composite granules 100 and the bentonite layers 200 for forming slurry, which are responsible for thermal conduction of the composite granular grouting material 10 according to the present embodiment, may be Na-bentonite. Ca-bentonite may be used after being mixed with $Na_2CO_3$ and then activated. Such bentonite includes montmorillonite as a primary component, and may be divided into Na-based bentonite or Ca-based bentonite depending on which cation is dominant among cations such as $Na^{2+}$ and $Ca^{2+}$ that are present between lamella structures of the montmorillonite in the bentonite.

Although Ca-based bentonite is primarily found in nature, cation of the Ca-based bentonite is replaced with $Na^{2+}$ to obtain the Na-based bentonite since the Na-based bentonite has superior viscosity and swellability relative to the Ca-based bentonite. The Ca-based bentonite is mined, ground, mixed with $Na_2CO_3$ powder, thus the resulting activated Na-based bentonite can be used for manufacturing the composite granular grouting material 10.

Figure 3:
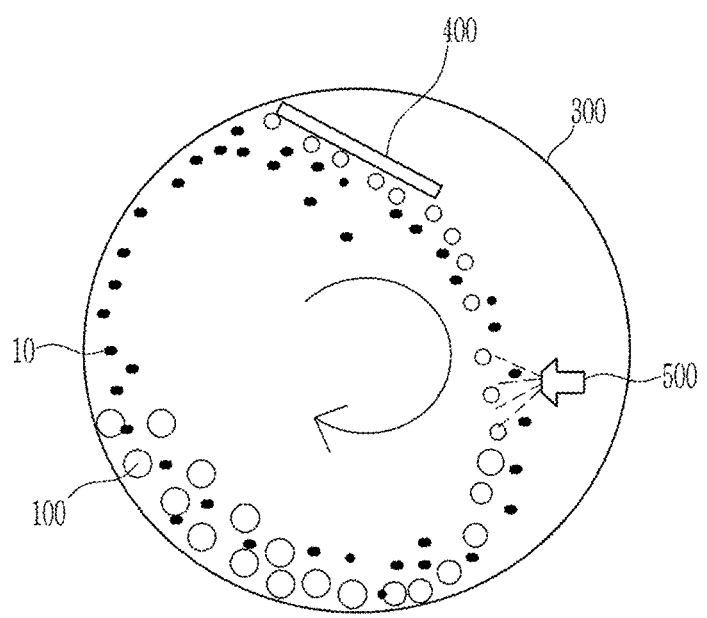
FIG. 3 shows the manufacturing apparatus for a composite granular grouting material according to the present invention.

FIG. 3 shows the apparatus for manufacturing a composite granular grouting material 10 according to the present invention. This is an agglomerating apparatus 300 which is called a granulator in general, in which a pan having a flat cylinder shape revolves in a slanted manner. A scraper 400 is attached onto the upper part of the granulator 300. When mixture of sand and bentonite is put into the granulator 300, sands are falling down by the scraper 400 before sands reach to the upper part of the granulator 300, and composite granules 100 comprising sand and bentonite are formed by water sprayed from a sprayer 500.

By adjusting the inclined angle and revolutions of the granulator 300 as well as the position and angle of the scraper 400, granules of required size can be obtained.

Whether the granulator is a batch-type apparatus in which a batch of sand and bentonite is processed, or a continuous apparatus to which raw material is applied continuously, the process proceeds equally.

The resulting composite granules are naturally dried or heated to a temperature range of 50 to 120° C. until moisture is evaporated completely to obtain spherical composite granules 100.

Then, the obtained spherical composite granules 100 and bentonite powders are put into the granulator 300 again, and the granulator 300 is operated with different operating parameter to form bentonite layer 200 having lower density for forming slurry outside the composite granules.

The bentonite layer 200 is dissolved in water and forms bentonite slurry which fills up the boundary between the composite granules 100, whereby fluid loss is decreased and the water blocking capability is increased.

Figure 4:
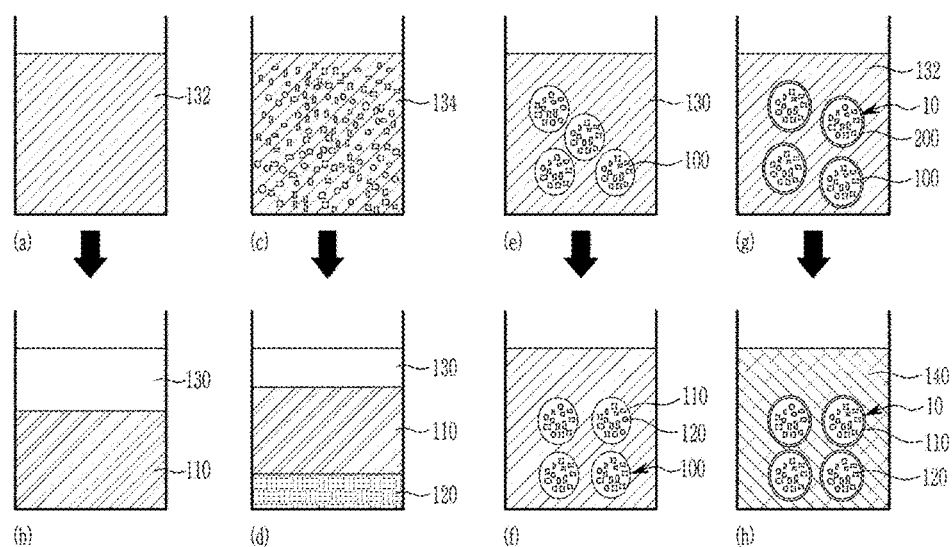
FIG. 4 is a drawing which explains the effectiveness of the composite granular grouting material according to the present invention.

FIG. 4 is a drawing which explains the effectiveness of a composite granular grouting material 10 according to the embodiment of the present invention.

First, FIG. 4(a) illustrates a case where slurry 132 is formed by mixing water and bentonite together according to a conventional method and, as shown in FIG. 4(b), slurry is separated into a water layer 130 and a layer of bentonite 110 due to the separation of the bentonite 110 over time.

FIG. 4(c) illustrates a case where slurry 134 is formed by mixing water, bentonite and sand according to a conventional method, and FIG. 4(d) shows a situation where the slurry 134 is divided into the layers of sand 120, bentonite 110, and water 130 due to differences in specific gravity over time.

In contrast, FIG. 4(e) illustrates a case where slurry 132 is formed by mixing composite granules 100 and water 130 without the bentonite layers 200 for forming slurry according to above Korean patent No. 1471003, and as can be seen from FIG. 4(f), separation did not occur over time, and the composite granules 100 has a form in which bentonite 110 and sand 120 agglomerate together.

But, if the ratio of sand to bentonite is to be increased to raise the thermal conductivity, surplus bentonite powders which have not been agglomerated with sand could be dissolved into water over time and the layers of bentonite and sand could be generated. Furthermore, when the bentonite granules, which are supposed to be used with water only, are used for construction, not only water but also bentonite slurry which are composed of water and bentonite powders are mixed with the bentonite granules, which causes inconvenience.

FIG. 4(g) illustrates a case where slurry 132 is formed by mixing water and composite granular grouting material 10 comprising composite granules 100, which are responsible for thermal conduction, and the bentonite layers 200 for forming slurry. FIG. 4(h) shows a situation where bentonite in the bentonite layer 200 for forming slurry and water react to form bentonite-rich slurry 140, thereby preventing separation of sand layer and bentonite layer, and showing excellent water blocking capability.

Figure 5:
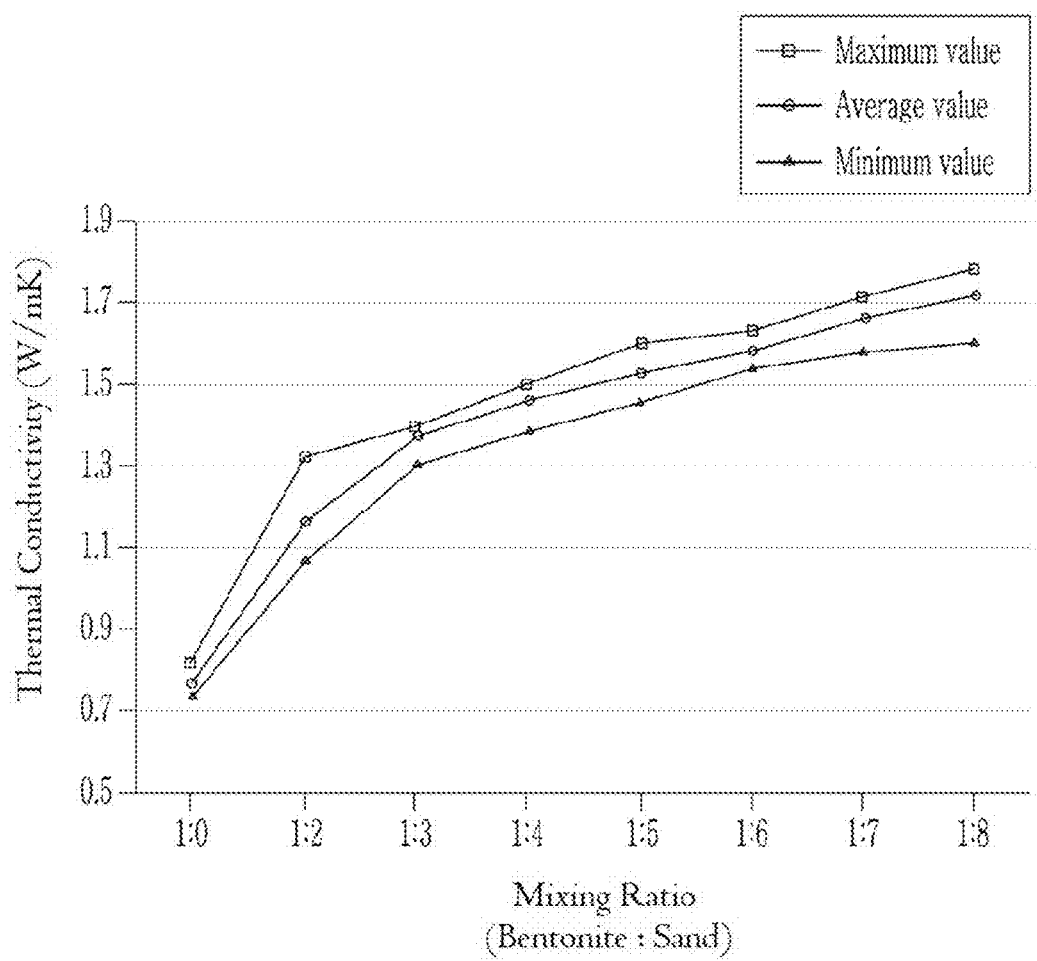
FIG. 5 is a graph plotting the measured thermal conductivity of the composite granular grouting material shown in FIG. 1.
Figure 6:
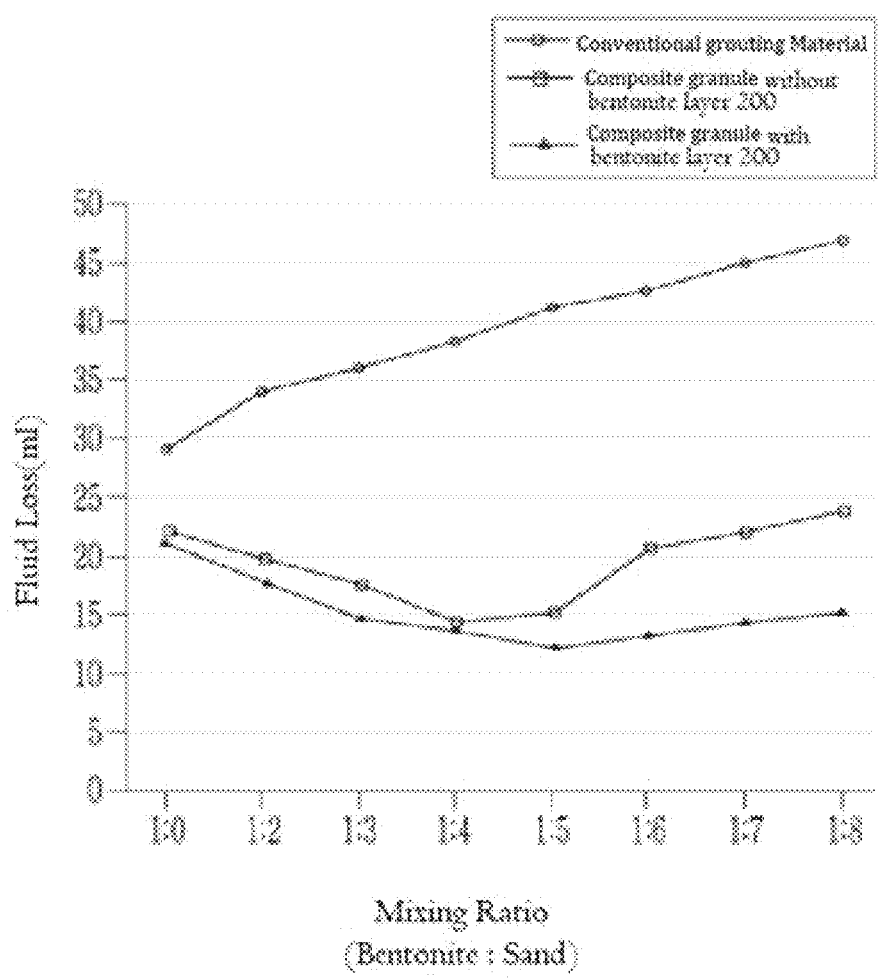
FIG. 6 is a graph plotting the measured fluid loss characteristic of the composite granular grouting material according to the prior art and the present invention.

FIG. 5 is a graph plotting the measured thermal conductivity of the composite granular grouting material 10 shown in FIG. 1, and FIG. 6 is a graph plotting the measured fluid loss characteristic of the composite granular grouting material 10. Here, the lower the fluid loss of a grouting material is, the better a water blocking capability is.

From the result of the measurement in FIG. 5, the content ratio of bentonite to sand up to 1:8 could be used, in which case thermal conductivity becomes 1.7 W/mK or more. For a reference, when a maximum sand content that can be actually used according to a conventional method is 30%, thermal conductivity was about 0.8 W/mK.

The Table 1 below shows the results of measurement data of FIG. 6.

composite granule having bentonite layer 200 for forming slurry to which water is added.

Evidently, when water is mixed with the composite granules having bentonite layer 200 for forming slurry, bentonite of bentonite layer 200 for forming slurry dissolves in water and fills up the boundary between the composite granules 100, hence fluid loss is decreased, and water blocking capability increases.

The detailed description of the invention is only for an illustrative purpose. This is used merely to illustrate the present invention, and is not used to limit meanings and the scope of the present invention described in the attached claims. Accordingly, it will be appreciated by those having ordinary knowledge in the art to which the present invention pertains that various modifications and other equivalent embodiments may be made from the detailed description. As a result, the true technical protection range of the present invention should be defined based on the technical spirit of the attached claims.

What is claimed is:

1. A method of manufacturing a composite granular grouting material, which comprises:
    mixing bentonite and one or more auxiliary components;
    forming spherical composite granules by agglomerating the mixture of bentonite and the one or more auxiliary components;
    drying the spherical composite granules; and
    forming bentonite layer having a lower density than the spherical composite granules outside the spherical composite granules by mixing bentonite with the spherical composite granules and agglomerating the same.

2. The method according to claim 1, wherein water is sprayed during agglomerating the mixture of bentonite and the one or more auxiliary components, and the mixture of bentonite and the spherical composite granules.

3. The method according to claim 1, wherein the one or more auxiliary components is/are at least one of sand, alumina, or graphite.

TABLE 1

Experimental Fluid Loss Data (Unit: ml)

| | Mixing ratio (Bentonite:Sand) | | | | | | | |
|---|---|---|---|---|---|---|---|---|
| | 1:1 | 1:2 | 1:3 | 1:4 | 1:5 | 1:6 | 1:7 | 1:8 |
| Conventional grouting material | 29.1 | 34.2 | 36.1 | 38.3 | 41.2 | 42.6 | 45.1 | 47.0 |
| Composite granule without bentonite layer 200 | 22.1 | 19.8 | 17.8 | 14.5 | 15.3 | 20.5 | 22.1 | 23.9 |
| Composite granule with bentonite layer 200 | 21.2 | 17.8 | 14.6 | 13.6 | 12.1 | 13.3 | 14.3 | 15.2 |

Above data shows the result of experiment in which slurry made of water 100 ml and bentonite 6g is poured into a pressure container and measuring volume of water which passes through a filter with applying 7-atmosphere nitrogen gas.

As evident from the Table 1, the fluid loss of the composite granule having the bentonite layer 200 for forming slurry according to the present invention is much less that than of the composite granule without the bentonite layer 200 for forming slurry.

Figure 7A:
Figure 7B:
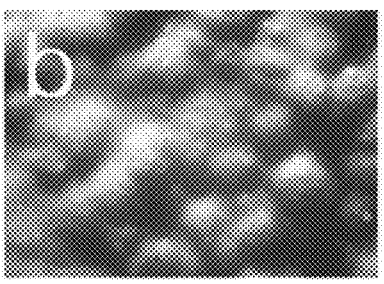

FIG. 7A shows micro-structure of composite granule without bentonite layer 200 for slurry forming to which water is added, and FIG. 7B shows micro-structure of 4. The method according to claim 3, wherein a mixing ratio of the bentonite to sand of the composite granules ranges from 1:1 to 1:8.

5. The method according to claim 1, wherein a binder is added to improve mechanical strength.

6. The method according to claim 1, wherein the bentonite layer further includes viscosity-reducing agent or dispersant.

7. The method according to claim 1, wherein an average diameter of the composite granular grouting material ranges from 1 mm to 10 mm.

8. The method according to claim 7, wherein water is sprayed during agglomerating the mixture of bentonite and the one or more auxiliary components and the mixture of bentonite and the spherical composite granules.

9. The method according to claim 1, wherein water is sprayed during agglomerating the mixture of bentonite and the one or more auxiliary components and the mixture of bentonite and the spherical composite granules, and wherein the one or more auxiliary components is/are at least one of sand, alumina, or graphite.

10. The method according to claim 9, wherein a mixing ratio of the bentonite to sand of the composite granules ranges from 1:1 to 1:8.

* * * * *